US 9,676,415 B2

(12) United States Patent
Poirier et al.

(10) Patent No.: US 9,676,415 B2
(45) Date of Patent: Jun. 13, 2017

(54) REAR DRIVE MODULE ASSEMBLY AND SYSTEM FOR MOUNTING TO A VEHICLE

(71) Applicant: GM Global Technology Operations LLC, Detroit, MI (US)

(72) Inventors: Daryl R. Poirier, Davisburg, MI (US); James C. Holtgreven, South Lyon, MI (US); Joseph A. Schudt, Macomb, MI (US); John E. Howard, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/656,987

(22) Filed: Mar. 13, 2015

(65) Prior Publication Data

US 2016/0263955 A1    Sep. 15, 2016

(51) Int. Cl.
*B62D 21/11* (2006.01)
*B60K 17/16* (2006.01)
*F16H 48/00* (2012.01)

(52) U.S. Cl.
CPC ............. *B62D 21/11* (2013.01); *B60K 17/16* (2013.01); *F16H 48/00* (2013.01); *B60G 2204/19* (2013.01)

(58) Field of Classification Search
CPC . B62D 21/11; B60G 3/22; B60G 3/12; B60G 3/14; B60G 2200/422; B60G 2204/19; B60G 9/003; B60K 17/16; B60K 17/165
See application file for complete search history.

(56) References Cited

U.S. PATENT DOCUMENTS

| 1,834,879 | A | * | 12/1931 | Trott | B60K 5/1216 180/291 |
| 2,732,903 | A | * | 1/1956 | Chayne | B60G 3/22 180/352 |
| 2,758,662 | A | * | 8/1956 | Peras | B60K 17/16 180/382 |
| 2,952,454 | A | * | 9/1960 | Muller | B60G 9/00 267/189 |
| 2,997,313 | A | * | 8/1961 | Wall | B62D 21/11 180/89.1 |
| 4,263,980 | A | * | 4/1981 | Harlow, Jr. | B62D 21/11 180/292 |
| 4,652,009 | A | * | 3/1987 | Ando | B60G 3/24 267/248 |

(Continued)

FOREIGN PATENT DOCUMENTS

| DE | 102011121262 A1 * | 6/2013 | ............ B60G 3/185 |
| DE | 102012111461 A1 * | 5/2014 | ............ B62D 21/11 |

(Continued)

*Primary Examiner* — Laura Freedman
(74) *Attorney, Agent, or Firm* — Cantor Colburn LLP

(57) ABSTRACT

A vehicle having a structure is provided. The system includes a cradle mounted to the structure at a first position and a second position, the second position being spaced apart from the first position. A rear drive module is provided having a housing, the housing coupled to the cradle between the first position and the second position, the housing coupled to the cradle in at least two locations. At least one linkage is operably coupled to the housing on a first end and to the structure on a second end.

15 Claims, 3 Drawing Sheets

(56) References Cited

U.S. PATENT DOCUMENTS

| | | | | |
|---|---|---|---|---|
| 4,811,970 A * | 3/1989 | Cassese | B60G 7/02 | 180/295 |
| 4,852,904 A * | 8/1989 | Yamamoto | B60G 7/02 | 280/124.156 |
| 4,856,751 A * | 8/1989 | Ohba | B60K 5/1291 | 180/291 |
| 4,865,350 A * | 9/1989 | Yamamoto | B60G 7/02 | 180/359 |
| 5,036,943 A * | 8/1991 | Kashiwagi | B60K 17/00 | 180/312 |
| 5,064,018 A * | 11/1991 | Encke | F16F 3/0873 | 180/360 |
| 5,074,374 A * | 12/1991 | Ohtake | B60K 5/1216 | 180/300 |
| 5,267,623 A * | 12/1993 | Kashiwagi | B60K 17/00 | 180/295 |
| 5,884,723 A * | 3/1999 | Kleinschmit | F16F 1/38 | 180/360 |
| 6,269,902 B1 * | 8/2001 | Miyagawa | B62D 21/11 | 180/312 |
| 6,571,903 B2 * | 6/2003 | Brissette | B60G 7/003 | 180/352 |
| 6,742,808 B1 * | 6/2004 | Kosak | B62D 21/11 | 280/781 |
| 7,946,377 B2 * | 5/2011 | Frasch | B62D 21/11 | 180/312 |
| 8,511,416 B2 * | 8/2013 | Hiruma | B60K 1/00 | 180/291 |
| 8,651,217 B2 * | 2/2014 | Kim | B62D 21/11 | 180/291 |
| 9,085,234 B2 * | 7/2015 | Saneyoshi | B60K 17/16 | |
| 9,227,664 B2 * | 1/2016 | Okuyama | B60K 17/165 | |
| 2009/0008846 A1 * | 1/2009 | Yamakawa | B60G 3/202 | 267/170 |
| 2015/0122561 A1 * | 5/2015 | Kashiwai | B60K 1/00 | 180/65.6 |

FOREIGN PATENT DOCUMENTS

| | | | | |
|---|---|---|---|---|
| DE | 102014206203 A1 * | 10/2015 | | B62D 21/11 |
| EP | 1081023 A1 * | 3/2001 | | B60K 5/04 |
| JP | 11334399 A * | 12/1999 | | |

* cited by examiner

REAR DRIVE MODULE ASSEMBLY AND SYSTEM FOR MOUNTING TO A VEHICLE

FIELD OF THE INVENTION

The subject invention relates to a vehicle having a rear drive module, and more particularly, to a system for mounting the rear drive module to the vehicle structure.

BACKGROUND

Vehicles, such as automobiles and trucks for example, include a rear drive module (RDM) that is connected to the vehicle engine by a prop-shaft. The prop-shaft transmits rotational energy (torque) developed by the vehicle engine to the rear drive module, which in turn transmits the rotational energy to the wheels. In a rear-wheel drive vehicle, the prop-shaft directly couples the RDM to the vehicle's transmission. In an all-wheel or four-wheel drive vehicle, additional components may also be included, such as a power take-off unit for example.

It should be appreciated that the transmission of rotational energy from the propshaft to the RDM, and from the RDM to the wheels generates reaction forces within the RDM to counter the transmitted torque. These reaction forces generally may be characterizes as a "roll" type and a "pitch" type movement. The roll type movement is a rotation about a longitudinal axis passing through the RDM. A roll type movement may cause the axles to flex with respect to the RDM and cause undesired noise and vibrations. A pitch type of movement is a rotation about the lateral axis the RDM due to a reaction to the drive torque at the wheels. Articulation of the RDM due to pitch also results in undesirable noise and vibration, and may also reduce the operating life of the prop-shaft.

Traditionally, to counter the reaction torques placed on the RDM, a mounting system was used that securely coupled the RDM to the vehicle structure, such as directly to the vehicle frame, or to an intermediary cross-member or cradle-member. Typically, these systems used some type of three-point mount that included isolation bushings that reduced the transmission of vibration from the RDM to the structure. It should be appreciated that these vibrations may have been due to the operation of the RDM and by the operation of the engine as well.

Traditionally, the vehicle engine was an internal combustion engine having cylinders that are alternately fired to produce the rotational energy. Due to a need to improve fuel efficiency, alternate control schemes for the vehicle engine have been developed that selectively deactivate cylinders. Under certain circumstances, when a cylinder is deactivated, no fuel is combusted and fuel efficiency is increased. However, it has been found that the deactivation of cylinders results in low frequency vibrations being transmitted to the RDM via the prop-shaft that were not previous experienced in traditional engine control configurations. Further, it has been found that in some circumstances, existing RDM mounting arrangements were inadequate to counter the excitation forces generated at these low frequencies.

Accordingly, it is desirable to provide an RDM and RDM mounting arrangement that provides a desired level of performance when subjected to low frequency vibrations from the vehicle engine.

SUMMARY OF THE INVENTION

In one exemplary embodiment of the invention, a vehicle having a structure is provided. The system including a cradle mounted to the structure at a first position and a second position, the second position being spaced apart from the first position. A rear drive module is provided having a housing, the housing coupled to the cradle between the first position and the second position, the housing coupled to the cradle in at least two locations. At least one linkage is operably coupled to the housing on a first end and to the structure on a second end.

In another exemplary embodiment of the invention, a vehicle having a structure is provided. The system having a cradle mounted to the structure in at least two positions. A rear drive module is provided having a housing, the housing disposed adjacent to the cradle between the at least two positions, the housing coupled to the cradle in at least two locations. A first linkage is operably coupled between the housing and the structure, the first linkage coupled to the housing on a side opposite the cradle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
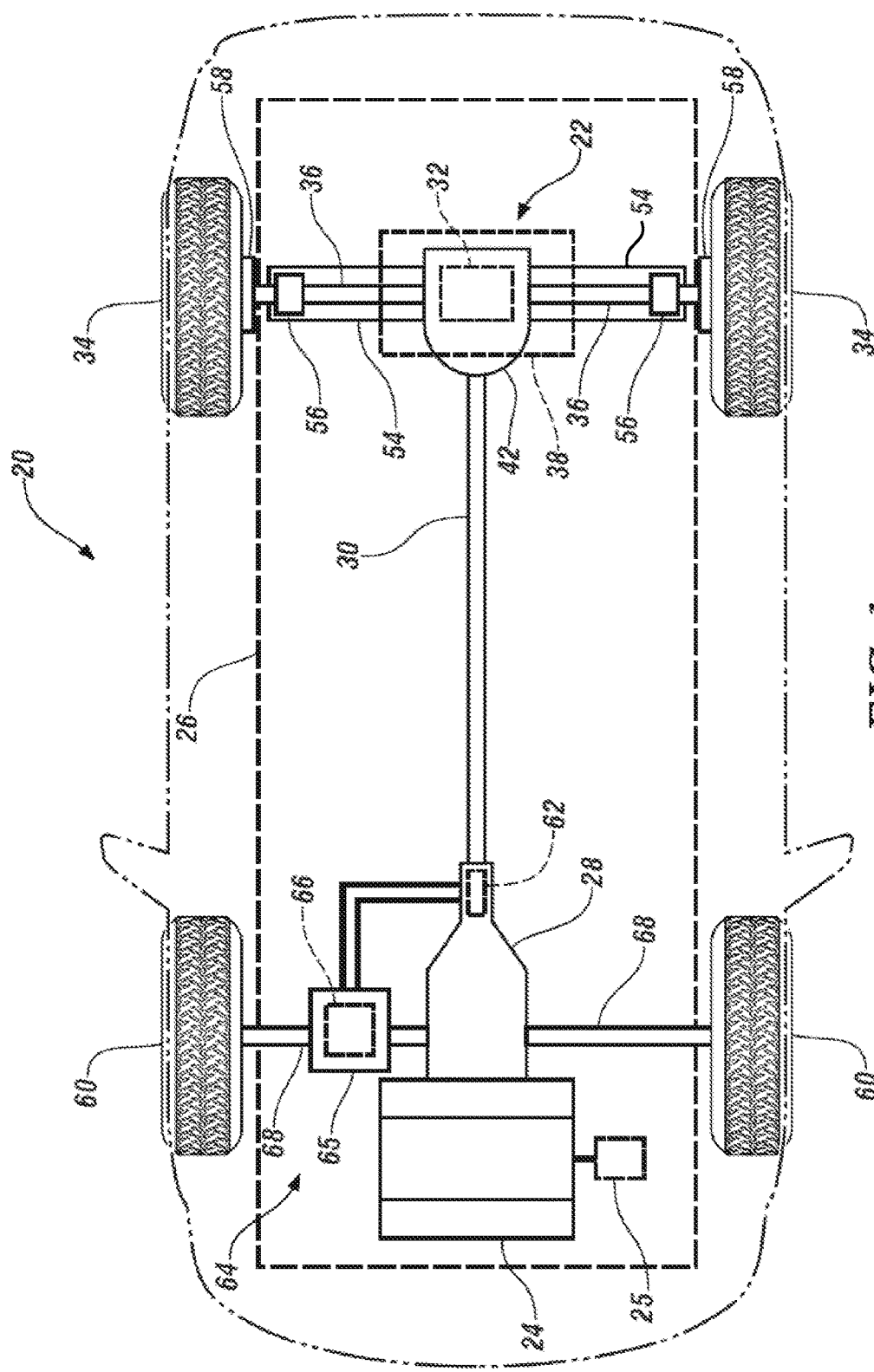
FIG. 1 is a schematic plan view of a vehicle having a rear drive module in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having a front axle assembly 64 and rear drive module (RDM) 22. It should be appreciated that the vehicle 20 may be an automobile or a truck for example. The vehicle 20 may include an engine 24, such as a gasoline or diesel fueled internal combustion engine. The engine 24 may further be a hybrid type engine that combines an internal combustion engine with an electric motor for example. In one embodiment, the engine 24 includes a controller or engine control module 25 that may selectively deactivate one or more cylinders of the engine 24 during operation.

The engine 24, RDM 22 and axle assembly 64 are coupled to a vehicle structure such as a chassis or frame 26. The engine 24 is coupled to the RDM 22 by a transmission or transfer case or coupling 28 and a prop-shaft 30. The transmission 28 may be configured to reduce the rotational velocity and increase the torque of the engine output. This modified output is then transmitted to the RDM 22 via the prop-shaft 30. The RDM 22 transmits the output torque from the prop-shaft 30 to a pair of driven-wheels 34 via axles 36 and wheel flanges 58.

In one embodiment, the RDM 22 includes a housing 42 such as a differential housing that supports a hypoid gear set 32. As used herein, the hypoid gear set 32 includes a ring gear, a pinion gear and a differential case. The differential case may include a differential gear set assembly as is known in the art for transmitting torque from the ring gear to the axles. In one embodiment, a pair of axle tubes 54 is coupled to and extends from the housing 42. One or more wheel bearings 56 may be disposed at an end of the axle tubes 54 distal from the differential housing 42 to support the axles 36. It should be appreciated that in other embodiments, the RDM 22 may have other configurations than a hypoid gear set. For example, in an electric or hybrid-type vehicle, the RDM may include electric motors that directly drive the wheels 34.

The vehicle 20 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 60, 34 respectively. The transfer case 62 transmits a portion of the output to the front axle assembly 64, which may include additional components such as a differential housing 65, a hypoid or differential gear set 66 and shafts 68 that transmit the output to the wheels 60.

Figure 2:
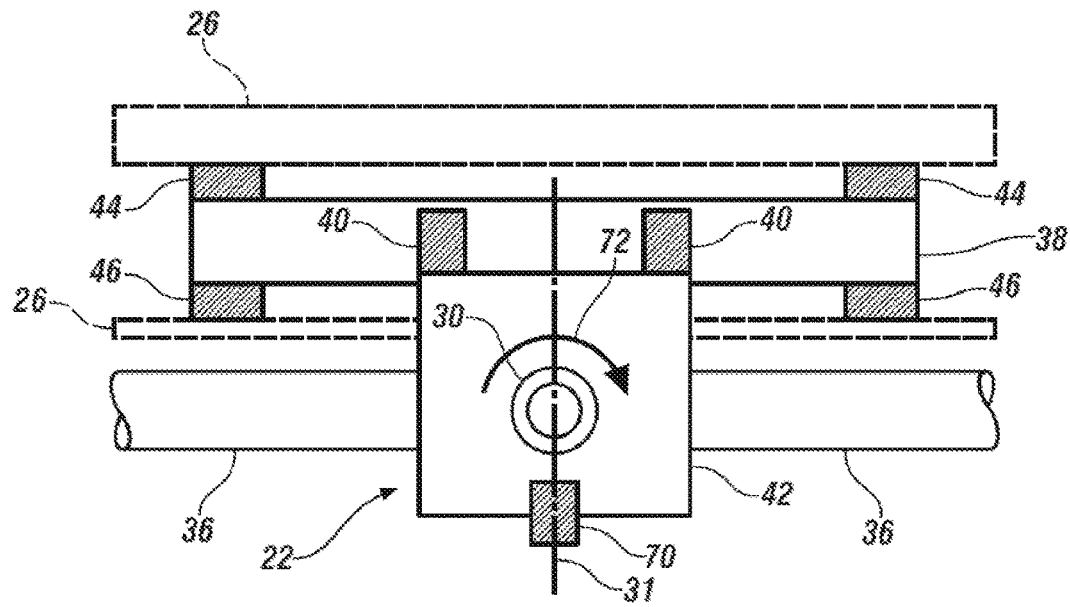
FIG. 2 is a front schematic view of a rear drive module for use in the vehicle of FIG. 1.
Figure 3:
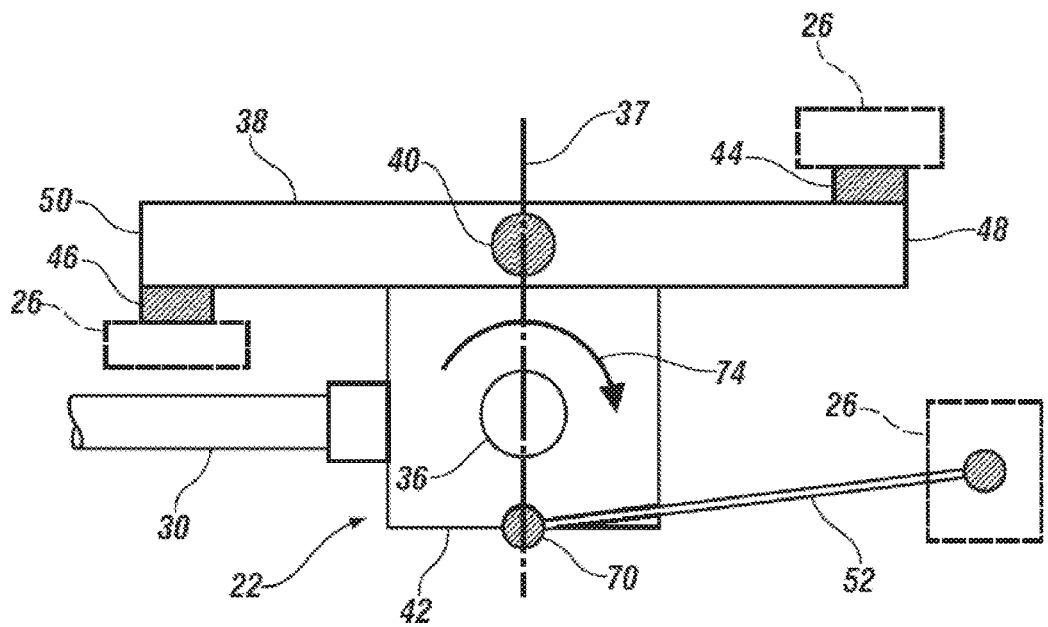
FIG. 3 is a side schematic view of the rear drive module of FIG. 2.

Referring now to FIGS. 2-3 with continuing reference to FIG. 1, RDM 22 will be described. It should be appreciated that while embodiments herein describe the claimed invention with respect to a rear-wheel drive vehicle, the claimed invention should not be so limited. In other embodiments, the RDM 22 may be used in a vehicle configured as an all-wheel or four-wheel drive vehicle.

In this embodiment, the RDM 22 includes a housing 42 that is coupled to a cradle member 38 by first and second cradle mounts 40. The cradle member 38 is a substantially rigid member that couples the RDM 22 to the frame 26. In one embodiment, the cradle member 38 is mounted to the frame 26 by a pair of upper frame mounts 44 and a pair of lower frame mounts 46. The upper frame mounts 44 may be arranged on the top surface on an end 48 of the cradle member 38 opposite the prop-shaft 30. While the lower frame mounts 46 may be arranged on a lower surface (e.g. closer to the ground than the upper frame mounts 44) on an end 50. In the illustrated embodiment of FIG. 3, the frame mounts 44, 46 are spaced apart from the rear and front sides of the housing 42 respectively. In one embodiment, the pair of upper frame mounts are arranged at a first and second position on a rear side of the housing 42. The cradle mounts 40 are disposed at a third and fourth position on opposing sides of an input centerline 31. The cradle mounts 46 are disposed at a fifth and sixth position on a front side of the housing 42.

As used herein, the term "top" or "top surface" refers to a surface that is generally opposite from or facing away from the ground when the vehicle is in its intended operating position, while the term "bottom" or "bottom surface" refers to a surface that is adjacent to or facing the ground. Similarly, the term "front" or "front side" refers to a side that is closer to or facing the engine 24, while term "rear" or "rear side" refers to a side that is away from or facing away from the engine 24. It should be appreciated that a rear drive module may have a housing that is not square or have flat surfaces but may also include curved and sloping surfaces and these relative terms refer to the general orientation of the particular side or surface and are not intended to be limiting.

The prop-shaft 30 is defined by the input centerline 31 that is oriented on a plane extending through the center of the prop-shaft 30. In one embodiment, each pair of frame mounts 44, 46 includes at least one mounting member on either side of the housing 42 and the input centerline 31. This arrangement of the frame mounts 44, 46 provides advantages in allowing the cradle member 38 to support RDM 22 against pitch and roll as well as the RDM 22 weight. Similarly the cradle mounts 40 are arranged on the top side of the housing and are disposed on either side of the input centerline 31. In one embodiment, the cradle mounts 40 are centrally located on the housing 42 and are aligned with an output centerline 37; the centerline 37 being defined by a plane extending vertically through the center of the output shafts of the RDM 22, such as the axles 36 for example.

The housing 42 is further coupled to the frame 26 by a pendular linkage 52. In one embodiment, the pendular linkage 52 is coupled to a side of the housing 42 opposite the mounts 40, such as the bottom side of the housing 42. The pendular linkage 52 is coupled by a linkage mount 70, such as a bushing for example. It should be appreciated that while the bushing may primarily provide for rotation about an axis in a single degree of freedom, in some embodiments, the elasticity of the bushing provides for limited movements in other degrees of freedom as well. In one embodiment, the linkage mount 70 is aligned with both the input centerline 31 and the output centerline 37. The pendular linkage 52 may be arranged to extend toward the rear of the vehicle 20 (e.g. away from the engine) to allow the pendular linkage 52 to be in tension under forward driving operation. The pendular linkage 52 is arranged near a horizontal orientation (when viewed from the side, FIG. 3) to reduce or minimize the vertical reaction to the frame 26. In one embodiment, the pendular linkage 52 may be angled (e.g. relative to the ground) to avoid link toggle, such as in reverse torque, when the pendular linkage 52 is in compression.

In operation, the engine 24 rotates the prop-shaft 30 and places a torque on the housing 42. The cradle mounts 40 generate a roll-type reaction, as indicated by arrow 72. Similarly, the axles 36 apply a pitch-type (front to rear or "fore-aft") movement on the housing 42, due to the axle 36 torque. Under the pitch movement, the pendular linkage 52 applies a reaction torque as indicated by arrow 74. Similarly, the cradle mounts 40 also apply a reaction force at the top of the housing 42 in response to the pitch movement. In one embodiment, the mounting arrangement for the RDM 22 may be configured such that the fore-aft forces at the cradle to body interfaces (e.g. frame mounts 44, 46) reduces or minimizes the overall assembly fore-aft excitation by acting out of phase with the fore-aft suspension inputs to the cradle member 38 from the same axle 36 vibration that drives the pitch-type movement. By reacting to the drive torque in the fore/aft direction into the cradle the vertical input to the frame is reduced and vertical floor vibration due to RDM pitch is also reduced or minimized.

Figure 4:
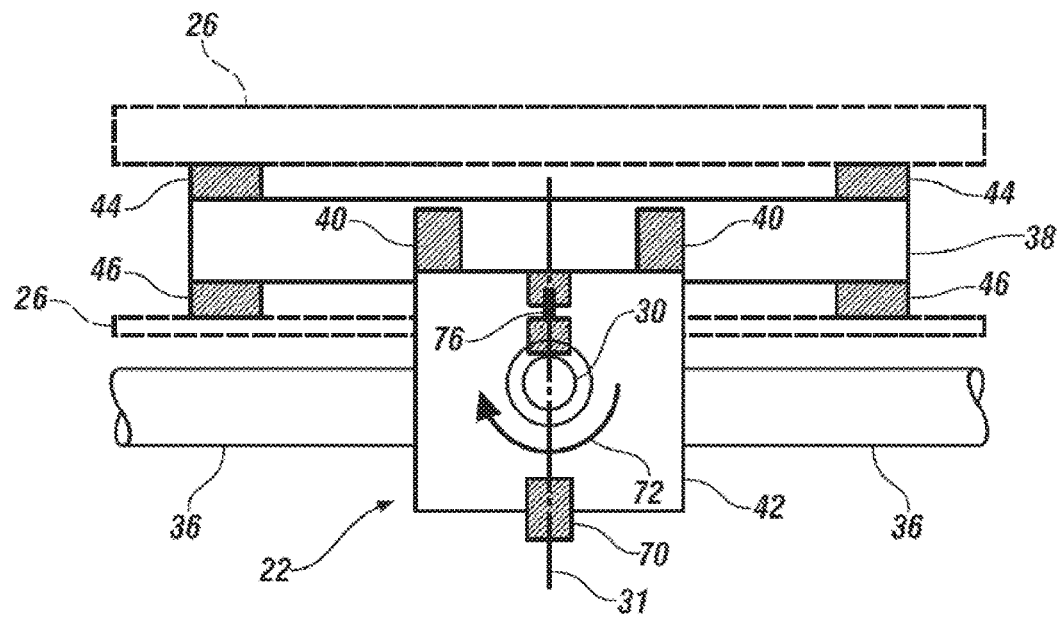
FIG. 4 is a front schematic view of another embodiment of a rear drive module for use in the vehicle of FIG. 1.
Figure 5:
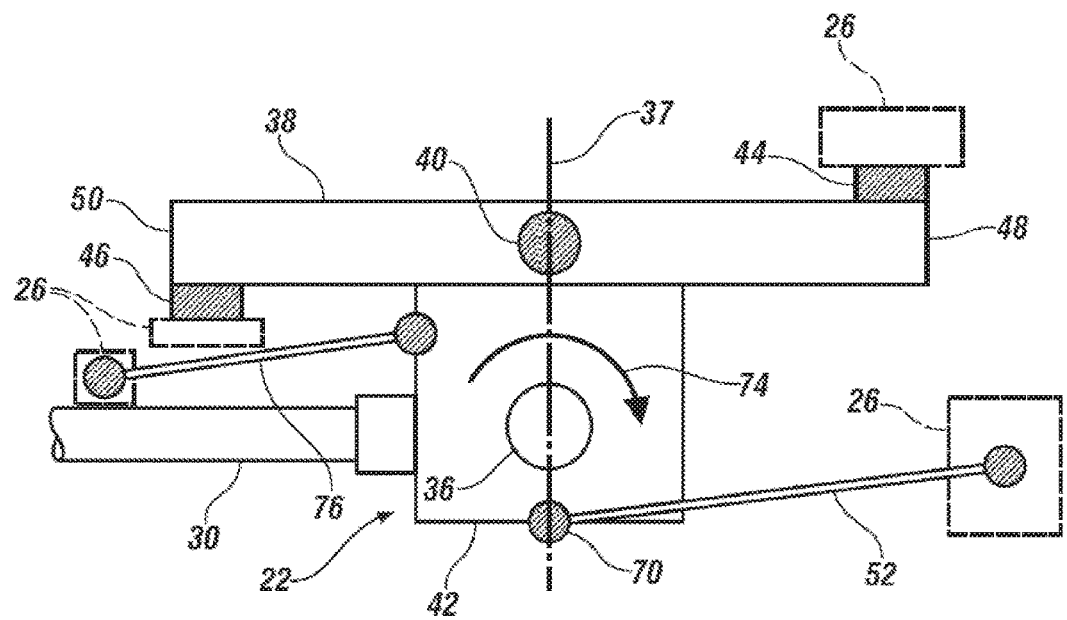
FIG. 5 is a side schematic view of the rear drive module of FIG. 4.

In some embodiments, it may be desirable to reduce or eliminate the vertical forces at the frame mounts 44, 46 due to the pitch and roll reactions at the cradle mounts 40. Referring now to FIG. 4 and FIG. 5, another embodiment is shown for RDM 22. In this embodiment, the frame mounts 44, 46 and cradle mounts 40 are arranged relative to the centerlines 31, 37 and the housing 42 in the same manner as described above. Also the rear pendular linkage 52 is coupled between the bottom of the housing 42 and the frame 26. The linkage mount 70 is aligned with both the input centerline 31 and the output centerline 37.

In the embodiment, a front pendular linkage 76 is coupled between the frame 26 and a side of the housing 42 opposite the rear pendular linkage 52, such as the front of the housing 42. In one embodiment, the front pendular linkage is aligned with the centerline 31. The front pendular linkage 76 may be arranged in parallel with the rear pendular linkage 52. In other words, if the rear pendular linkage 52 is arranged on a small angle (relative to the ground), then the front pendular linkage 76 is arranged on the same angle. In one embodiment, the pendular linkages 52, 76 are arranged in tension when the vehicle 20 is operated under forward driving operations.

In this embodiment, the cradle mounts 40 support the weight (vertical) of the RDM 22 and react to the roll-type movement generated by the prop-shaft 30 (indicated by the arrow 72) in a similar manner to that described above. However, the front pendular linkage 76 and the rear pendular linkage 52 react to the pitch-type movement (indicated by arrow 74), which decouples the pitch-type movement from the cradle mounts 40. It should be appreciated that as a result, the vertical forces at the frame mounts 44, 46 are reduced or eliminated. This arrangement provides advantages in decoupling the fore-aft dynamics, which allows for increased flexibility in the arrangement of the mounting system to provide desired performance characteristics.

It should be appreciated that while FIGS. 2-5 illustrate the frame 26 and cradle member 38 as being linear or flat members, this is for exemplary purposes and the claimed invention should not be so limited. In other embodiments, either the cradle member 38 or the frame 26 may include portions that are curved, angled or sloped. Further, either the frame 26 or the cradle member 38 may be composed of a plurality of members or include a main carrying member and have brackets or flanges that couple the member to the RDM 22. The inclusion of brackets or flanges may allow the mounts 40, 44, 46 to be arranged level or in-line with the main carrying member for example. In one embodiment, the rear frame mounts 44 may be arranged level with or partially below the cradle mounts 40.

It should be appreciated that while embodiments described herein reference the pendular linkages as being arranged in tension when the vehicle is in a forward operating mode, this is for exemplary purposes and the claimed invention should not be so limited. In other embodiments, the pendular linkages may be arranged in compression when the vehicle is in the forward operating mode. It should further be appreciated that while the illustrated embodiments reference the roll-type and pitch-type reactions as being in a particular direction, this is also for exemplary purposes and the claimed invention should not be so limited. In other embodiments, one or both of the roll-type and pitch-type reactions may be in the opposite direction.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle having a structure comprising:
a cradle mounted to the structure at a first position and a second position, the second position being spaced apart from the first position;
a rear drive module having a housing, the housing coupled to the cradle between the first position and the second position, the housing coupled to the cradle in at least two locations;
a linkage mount coupled to a side of the housing opposite the cradle and aligned with an output centerline; and
at least one linkage rotationally coupled to the linkage mount on a first end and to the structure on a second end, wherein the linkage mount is configured to allow rotation about an axis in at least a single degree of freedom.

2. A vehicle having a structure comprising:
a cradle mounted to the structure at a first position and a second position, the second position being spaced apart from the first position;
a rear drive module having a housing, the housing coupled to the cradle between the first position and the second position, the housing coupled to the cradle in at least two locations; and
at least one linkage operably coupled to the housing on a first end and to the structure on a second end;
wherein the housing is coupled to the cradle along an output centerline of the housing.

3. The vehicle of claim 2 wherein the at least one linkage is coupled to the housing along the output centerline of the housing and an input centerline of the housing.

4. The vehicle of claim 3 wherein:
the rear drive module includes at least one axle, the output centerline being defined by the center of the at least one axle; and
the rear drive module is configured to couple with a prop-shaft, the input centerline being defined by a center of the prop-shaft.

5. The vehicle of claim 3 wherein the housing is coupled to the cradle in a third position and a fourth position, the third position and fourth position being disposed on opposing sides of the input centerline.

6. The vehicle of claim 5 wherein the third position and fourth position are arranged on a top side of the housing, the at least one linkage being coupled to the housing on a bottom side of the housing.

7. The vehicle of claim 3 wherein the first position and second position are arranged on opposite sides of the input centerline.

8. The vehicle of claim 3 wherein the first position and second position are arranged on opposite sides of the output centerline.

9. The vehicle of claim 3 wherein the cradle is further coupled to the structure at a fifth position and sixth position, the first position and the second position being arranged on a rear side of the output centerline and the fifth position and the sixth position being arranged on a front side of the output centerline, the front side being closer to a vehicle power source than the rear side.

10. The vehicle of claim 9 wherein the first position and the second position are arranged on a top side of the cradle and the fifth position and sixth position are on a bottom side of the cradle.

11. A vehicle having a structure comprising:
a cradle mounted to the structure in at least two positions;
a rear drive module having a housing, the housing disposed adjacent to the cradle between the at least two positions, the housing coupled to the cradle in at least two locations;
a linkage mount coupled to a side of the housing opposite the cradle and aligned with an output centerline; and
a first linkage operably coupled between the housing and the structure, the first linkage being rotationally coupled to the housing by the linkage mount on a side opposite the cradle, wherein the linkage mount is configured to allow rotation about an axis in at least a single degree of freedom.

12. The vehicle of claim 11 wherein the housing is coupled to the cradle by a first cradle mount and a second cradle mount, the first cradle mount and second cradle mount arranged opposite sides of a centerline of an input shaft.

13. A vehicle having a structure comprising:
a cradle mounted to the structure in at least two positions; and
a rear drive module having a housing, the housing disposed adjacent to the cradle between the at least two positions, the housing coupled to the cradle in at least two locations; and
a first linkage operably coupled between the housing and the structure, the first linkage coupled to the housing on a side opposite the cradle;
wherein the housing is coupled to the cradle by a first cradle mount and a second cradle mount, the first cradle mount and second cradle mount arranged opposite sides of a centerline of an input shaft; and
wherein the cradle is mounted to the structure by a first pair of structure mounts and a second pair of structure mounts, the first pair of structure mounts being arranged on a top side of the cradle, the second pair of structure mounts being arranged on a bottom side of the cradle.

14. The vehicle of claim 13 wherein the first pair of structure mounts is arranged adjacent to and spaced apart from a rear side of the housing and the second pair of structure mounts is arranged adjacent to and spaced apart from the front side of the housing.

15. The vehicle of claim 14 wherein the first cradle mount and second cradle mount are aligned with a centerline defined by a vehicle axle.

* * * * *